(12) United States Patent
Kono et al.

(10) Patent No.: US 12,184,339 B2
(45) Date of Patent: Dec. 31, 2024

(54) MICROWAVE PHOTON CONTROL DEVICE, MICROWAVE PHOTON TRANSMITTER, MICROWAVE PHOTON RECEIVER, MICROWAVE PHOTON REPEATER, AND QUANTUM COMPUTER

(71) Applicant: JAPAN SCIENCE AND TECHNOLOGY AGENCY, Kawaguchi (JP)

(72) Inventors: Shingo Kono, Wako (JP); Yasunobu Nakamura, Tokyo (JP)

(73) Assignee: JAPAN SCIENCE AND TECHNOLOGY AGENCY, Saitama (JP)

( * ) Notice: Subject to any disclaimer, the term of this patent is extended or adjusted under 35 U.S.C. 154(b) by 414 days.

(21) Appl. No.: 17/790,819

(22) PCT Filed: Dec. 28, 2020

(86) PCT No.: PCT/JP2020/049180
§ 371 (c)(1),
(2) Date: Jul. 5, 2022

(87) PCT Pub. No.: WO2021/140995
PCT Pub. Date: Jul. 15, 2021

(65) Prior Publication Data
US 2022/0376797 A1    Nov. 24, 2022

(30) Foreign Application Priority Data
Jan. 8, 2020    (JP) .................. 2020-001696

(51) Int. Cl.
*H04B 10/70*    (2013.01)
*G06N 10/40*    (2022.01)
*G21K 1/00*    (2006.01)

(52) U.S. Cl.
CPC ............. *H04B 10/70* (2013.01); *G06N 10/40* (2022.01); *G21K 1/003* (2013.01)

(58) Field of Classification Search
CPC .............................. G06N 10/40; H04B 10/70
(Continued)

(56) References Cited
U.S. PATENT DOCUMENTS

2017/0093381 A1*  3/2017  Abdo ................. H03K 3/38
2018/0107092 A1*  4/2018  Abdo ................. G02F 1/3526
(Continued)

FOREIGN PATENT DOCUMENTS

JP        2013214051 A    10/2013

OTHER PUBLICATIONS

Guimond et al: "A Unidirectional On-Chip Photonic Interface for Superconducting Circuits", arxiv.org, Cornell University Library, Nov. 6, 2019 (Nov. 6, 2019), arXiv:1911.02460, pp. 1-10 (Year: 2019).*

(Continued)

*Primary Examiner* — Li Liu
(74) *Attorney, Agent, or Firm* — Muncy, Geissler, Olds & Lowe, P.C

(57) ABSTRACT

A microwave photon control device includes a first qubit and a second qubit that are connected in parallel to a waveguide through which microwave photons propagate, and a direct coupling between the first qubit and the second qubit. An interval between the first qubit and the second qubit is ($\frac{1}{4}$+n/2) times as long as a wavelength of microwave photons (where n is an integer equal to or larger than 0). A quantum entangled state is formed between the first qubit and the second qubit. The direct coupling cancels out a coupling via the waveguide between the first qubit and the second qubit. By a relaxation rate of the first qubit and the second qubit, and a phase of the quantum entangled state (Continued)

being controlled, the microwave photon control device operates while switching between a first operation mode, a second operation mode, and a third operation mode.

12 Claims, 11 Drawing Sheets

(58) Field of Classification Search
USPC .......................................... 398/39, 40, 178
See application file for complete search history.

(56) References Cited

U.S. PATENT DOCUMENTS

2018/0330266 A1    11/2018  Simmons et al.
2022/0021372 A1*    1/2022  Nakamura ............. G06N 10/00
2022/0303023 A1*    9/2022  Innes ................. H04Q 11/0005

OTHER PUBLICATIONS

Guimond et al., "A unidirectional on-chip photonic interface for superconducting circuits," Nature Partner Journals Quantum Information, Mar. 27, 2020, vol. 6, No. 32, 12 pages.
Kannan et al., "Waveguide Quantum Electrodynamics with Superconducting Qubits," Massachusetts Institute of Technology, Sep. 2018, 87 pages.
Pechal et al., "Microwave-controlled generation of shaped single photons in circuit quantum electrodynamics," Physical Review X 4, Oct. 29, 2018, 9 pages.
Kurpiers et al., "Deterministic Quantum State Transfer and Generation of Remote Entaglement using Microwave Photons," Nature 558, 2018, 11 pages.
Chow et al., "A simple all-microwave entangling gate for fixed-frequency superconducting qubits," Phys. Rev. Lett. 107, 2011, 5 pages.
Yin et al., "Catch and Release of Microwave Photon States," Physical Review Letters, Mar. 8, 2013, 5 pages.
Chen et al., "Qubit architecture with high coherence and fast tunable coupling," Phys. Rev. Lett. 113, 2014, 10 pages.
Guimond Po et al: "A Unidirectional On-Chip Photonic Interface for Superconducting Circuits", arxiv.org, Cornell University Library, 201 Olin Library Cornell University Ithaca, NY 14853, Nov. 6, 2019 (Nov. 6, 2019), XP081526287, Section I . to V. ; pp. 1-10.
Japanese Office Action issued for corresponding Japanese Patent Application No. 2021-570037 dated Oct. 1, 2024;pp. 1-7.

* cited by examiner

MICROWAVE PHOTON CONTROL DEVICE, MICROWAVE PHOTON TRANSMITTER, MICROWAVE PHOTON RECEIVER, MICROWAVE PHOTON REPEATER, AND QUANTUM COMPUTER

TECHNICAL FIELD

The present invention relates to a microwave photon control device, a microwave photon transmitter, a microwave photon receiver, a microwave photon repeater, and a quantum computer.

BACKGROUND ART

There has been proposed a method of forming a quantum network by connecting chips on which qubits are implemented, using the propagation of microwave photons (photons having energy in a microwave region with a wavelength of several centimeters) (e.g., refer to Non Patent Literatures 1 and 2).

CITATION LIST

Non Patent Literature

[Non Patent Literature 1] M. Pechal, L. Huthmacher, C. Eichler, S. Zeytinoglu, A. A. Abdumalikov, Jr., S. Berger, A. Wallraff, and S. Filipp "Microwave-controlled generation of shaped single photons in circuit quantum electrodynamics", Physical Review X 4, 041010(2014)

[Non Patent Literature 2] P. Kurpiers, P. Magnard, T. Walter, B. Royer, M. Pechal, J. Heinsoo, Y. Salathe, A. Akin, S. Storz, J.-C. Besse, S. Gasparinetti, A. Blais, A. Wallraff, "Deterministic Quantum State Transfer and Generation of Remote Entanglement using Microwave Photons", Nature 558, 264-267 (2018)

[Non Patent Literature 3] J. M. Chow, A. D. Corcoles, J. M. Gambetta, C. Rigetti, B. R. Johnson, J. A. Smolin, J. R. Rozen, G. A. Keefe, M. B. Rothwell, M. B. Ketchen, M. Steffen, "A simple all-microwave entangling gate for fixed-frequency superconducting qubits", Phys. Rev. Lett. 107, 080502 (2011)

[Non Patent Literature 4] Y. Yin, Y. Chen, D. Sank, P. J. J. O'Malley, T. C. White, R. Barends, J. Kelly, E. Lucero, M. Mariantoni, A. Megrant, C. Neill, A. Vainsencher, J. Wenner, A. N. Korotkov, A. N. Cleland, and J. M. Martinis, "Catch and Release of Microwave Photon States", Phys. Rev. Lett. 110, 107001 (2013)

[Non Patent Literature 5] Y. Chen, C. Neill, P. Roushan, N. Leung, M. Fang, R. Barends, J. Kelly, B. Campbell, Z. Chen, B. Chiaro, A. Dunsworth, E. Jeffrey, A. Megrant, J. Y. Mutus, P. J. J. O'Malley, C. M. Quintana, D. Sank, A. Vainsencher, J. Wenner, T. C. White, Michael R. Geller, A. N. Cleland, and J. M. Martinis "Qubit Architecture with High Coherence and Fast Tunable Coupling" Phys. Rev. Lett. 113, 220502 (2014)

SUMMARY OF INVENTION

Technical Problem

By implementing qubits onto a chip in an integrated manner, a macroscopic quantum circuit can be formed. Nevertheless, the number of qubits that can be implemented on one chip has a limitation. In view of the foregoing, there has been proposed a method of increasing the total number of qubits by forming a quantum network by connecting chips in a quantum manner using the propagation of microwave photons. Hereinafter, microwave photons that carry quantum information between qubits will be referred to as "propagation microwave photons". In this case, for example, using a superposition state of a propagation microwave single photon state and a vacuum state, quantum information is transmitted. At this time, for realizing a quantum network with a complicated topology, it is necessary to control the propagation direction of propagation microwave photons. Circulators have been known as an example of a device for implementing such direction control. Among the circulators, circulators applicable to quantum networks include a ferrite circulator and a superconducting circulator. Nevertheless, such circulators have the following problems.

First of all, because a ferrite circulator uses a magnetic field, it is difficult to install the ferrite circulator in proximity to a superconducting circuit used for superconducting qubits. In addition, the ferrite circulator has large propagation loss and low performance. Furthermore, because the ferrite circulator is large in physical size, the ferrite circulator has low extensibility. In addition, the ferrite circulators have a fixed propagation direction and cannot be controlled to change it temporally. The ferrite circulator therefore has a disadvantage of being hard to be used as a router.

On the other hand, because a superconducting circulator uses a superconducting circuit, the superconducting circulator is highly compatible with superconducting qubits. Nevertheless, because the superconducting circulator requires many microwave sources and microwave cables, the superconducting circulator has such a problem that adjustment is difficult and extensibility is low. Furthermore, because the superconducting circulator can execute a circulating operation only within a line width of a resonator to be used, a frequency band is narrow.

The present invention has been devised in view of such problems, and the object of the present invention is to provide a technology of controlling the propagation direction of propagation microwave photons in a quantum network without requiring a circulator.

Solution to Problem

For solving the above-described problems, a microwave photon control device according to an aspect of the present invention includes a first qubit and a second qubit that are connected in parallel to a waveguide through which microwave photons propagate, and a direct coupling between the first qubit and the second qubit. An interval between the first qubit and the second qubit is ($¼+n/2$) times as long as a wavelength of microwave photons (where n is an integer equal to or larger than 0). A quantum entangled state is formed between the first qubit and the second qubit. The direct coupling cancels out a coupling via the waveguide between the first qubit and the second qubit. By a phase of the quantum entangled state between the first qubit and the second qubit, and/or couplings between the first qubit and the second qubit, and the waveguide being controlled, the microwave photon control device operates while switching between a first operation mode for emitting microwave photons in one direction of the waveguide, a second operation mode for absorbing microwave photons that have propagated from one direction of the waveguide, and a third operation mode for letting through microwave photons that have propagated from one direction of the waveguide, to propagate.

Another aspect of the present invention is a microwave photon transmitter. The microwave photon transmitter includes a first qubit and a second qubit that are connected in parallel to a waveguide through which microwave photons propagate, and a direct coupling between the first qubit and the second qubit. An interval between the first qubit and the second qubit is (¼+n/2) times as long as a wavelength of microwave photons (where n is an integer equal to or larger than 0). A quantum entangled state is formed between the first qubit and the second qubit. The direct coupling cancels out a coupling via the waveguide between the first qubit and the second qubit. By a phase of the quantum entangled state between the first qubit and the second qubit, and/or couplings between the first qubit and the second qubit, and the waveguide being controlled, the microwave photon transmitter emits microwave photons in one direction of the waveguide.

Yet another aspect of the present invention is a microwave photon receiver. The microwave photon receiver includes a first qubit and a second qubit that are connected in parallel to a waveguide through which microwave photons propagate, and a direct coupling between the first qubit and the second qubit. An interval between the first qubit and the second qubit is (¼+n/2) times as long as a wavelength of microwave photons (where n is an integer equal to or larger than 0). The direct coupling cancels out a coupling via the waveguide between the first qubit and the second qubit. By bringing both the first qubit and the second qubit into a ground state as an initial state, the microwave photon receiver absorbs microwave photons that have propagated from one direction of the waveguide.

Yet another aspect of the present invention is a microwave photon repeater. The microwave photon repeater includes a first qubit and a second qubit that are connected in parallel to a waveguide through which microwave photons propagate, and a direct coupling between the first qubit and the second qubit. An interval between the first qubit and the second qubit is (¼+n/2) times as long as a wavelength of microwave photons (where n is an integer equal to or larger than 0). The direct coupling cancels out a coupling via the waveguide between the first qubit and the second qubit. By turning off relaxation from the first qubit and the second qubit to the waveguide, the microwave photon repeater lets through microwave photons that have propagated from one direction of the waveguide, to propagate.

Yet another embodiment of the present invention is a quantum computer. The quantum computer includes a plurality of the above-described microwave photon control devices that are arranged at ends of a quantum circuit module on which a plurality of superconducting qubits are implemented, and transmit and receive quantum states between the quantum circuit modules.

In addition, any combination of the above-described constituent elements, and an aspect obtained by converting a wording in the present invention between an apparatus, a method, a system, a recording medium, a computer program, and the like are also effective as an aspect of the present invention.

Advantageous Effects of Invention

According to the present invention, the propagation direction of propagation microwave photons in a quantum network can be controlled without using a circulator.

DESCRIPTION OF EMBODIMENTS

Figure 1:
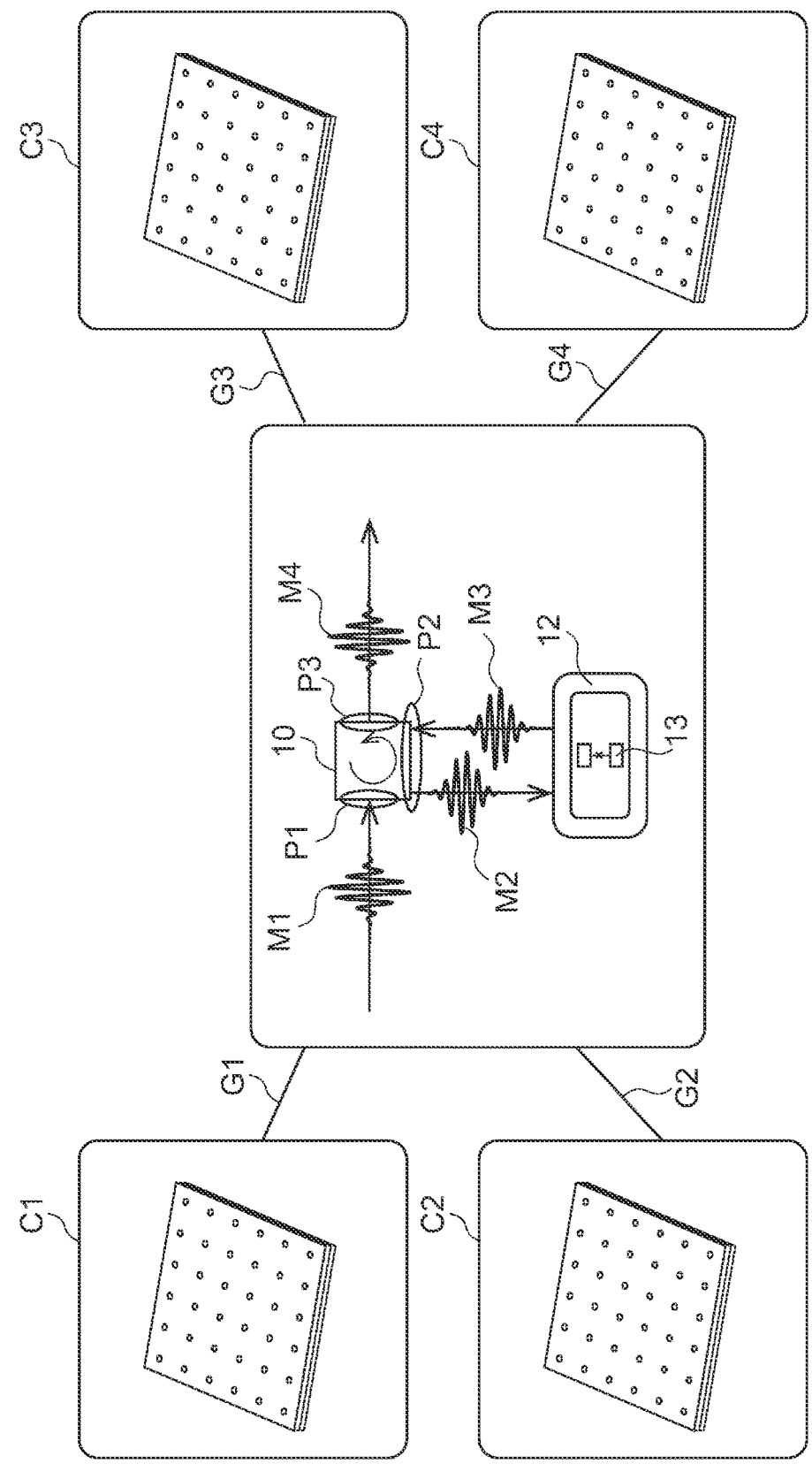
FIG. 1 is a schematic diagram illustrating an operation of a circulator according to a comparative example.

Hereinafter, the description will be given on the basis of preferred embodiments of the present invention with reference to the drawings. The embodiments are not intended to limit the present invention and are exemplifications, and not all features described in the embodiments and a combination thereof are always essential to the present invention. The same or equivalent constituent elements, members, and processes illustrated in the drawings are assigned the same reference numerals, and the redundant description will be appropriately omitted. In addition, scale sizes and shapes of members illustrated in the drawings are set in an expedient manner for simplifying the description, and are not to be construed in a limited manner unless otherwise stated. In addition, in a case where a term such as "first" or "second" is used in this specification and the appended claims, the term does not indicate any order or importance degree unless otherwise stated, and the term is used for merely distinguishing between a certain configuration and another configuration. In addition, illustration of a part of members unimportant in describing the embodiments is omitted in the drawings.

Comparative Example: Circulator

Before describing a specific embodiment, a comparative example will be described. FIG. 1 schematically illustrates an operation of a circulator according to a comparative example. In this example, four chips C1, C2, C3, and C4 on which qubits are implemented are connected using circulators via waveguides G1, G2, G3, and G4, respectively, and a quantum network is formed as a whole. Nevertheless, FIG. 1 illustrates a circulator 10 as one representative circulator of a plurality of circulators. The circulator 10 includes three ports P1, P2, and P3. Qubits implemented on chips existing in remote areas are connected to the ports P1 and P3. A qubit 13 implemented on a chip existing in a local area is connected to the port P2. The qubit 13 is confined by a resonator 12.

If a propagation microwave photon M1 propagating rightward through the waveguide enters the port P1 of the circulator 10, the propagation microwave photon M1 changes the direction to a counterclockwise direction. After that, the propagation microwave photon exits from the port P2 of the circulator 10 as a propagation microwave photon M2, and enters the qubit 13. At this time, the propagation microwave photon M1 neither exists from the port P3 of the circulator 10 rightward through the waveguide, nor exists from the port P1 of the circulator 10 leftward through the waveguide. In other words, in this case, all the propagation microwave photons M1 that have propagated rightward and entered the circulator 10 are absorbed by the qubit 13.

If a propagation microwave photon M3 exiting upward from the qubit 13 enters the port P2 of the circulator 10, the propagation microwave photon M3 changes the direction to a counterclockwise direction. After that, the propagation microwave photon exits rightward through the waveguide from the port P3 of the circulator 10 as a propagation microwave photon M4. At this time, the propagation microwave photon M3 neither exits leftward from the port P1 of the circulator 10, nor be reabsorbed by the qubit 13. In other words, in this case, all the propagation microwave photons M3 emitted from the qubit 13 exit rightward from the port P3 of the circulator 10.

If a propagation microwave photon propagating leftward through the waveguide enters the port P3 of the circulator 10, the propagation microwave photon continues to proceed leftward within the circulator 10 (which is not illustrated for preventing the drawing from becoming complicated). After that, the propagation microwave photon exits leftward through the waveguide from the port P1 of the circulator 10. At this time, the propagation microwave photon neither be absorbed by the qubit 13, nor exit rightward from the port P3 of the circulator 10. In other words, in this case, all propagation microwave photons that have propagated leftward and entered the circulator 10 pass through the circulator 10.

As described above, the circulator 10 controls the propagation direction of propagation microwave photons to circulate counterclockwise.

First Embodiment

Figure 2:
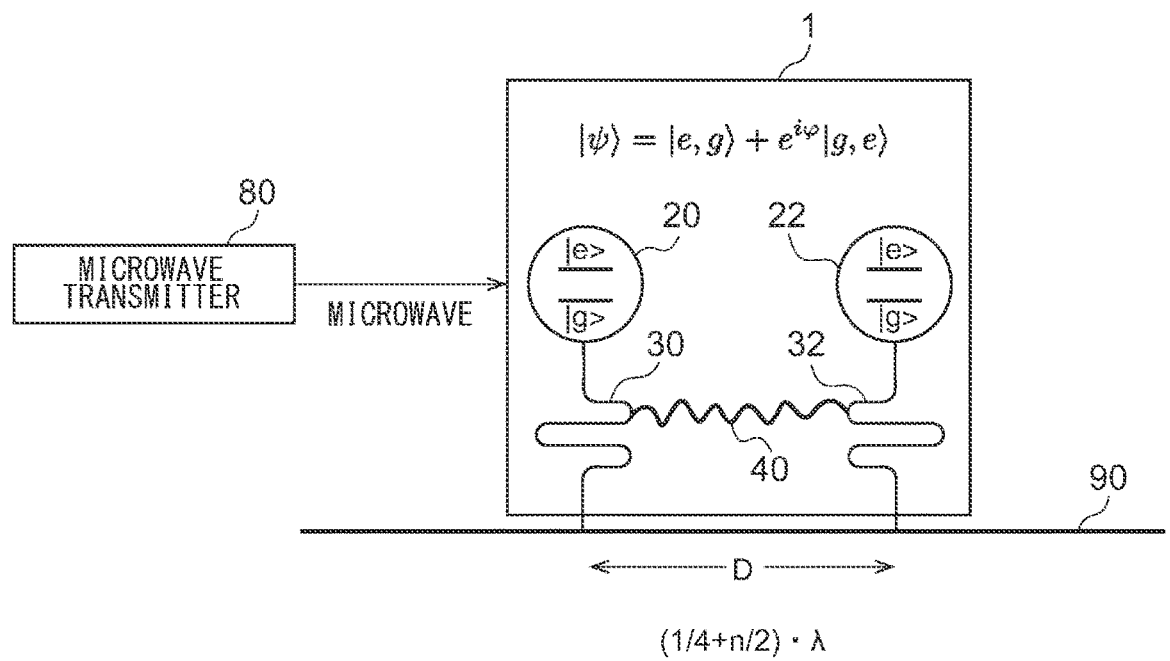
FIG. 2 is a schematic diagram of a microwave photon control device according to a first embodiment.

FIG. 2 schematically illustrates a microwave photon control device 1 according to the first embodiment. The microwave photon control device 1 includes a first qubit 20, a second qubit 22, a first resonator 30, a second resonator 32, and a direct coupling 40 between the first resonator 30 and the second resonator 32. The first qubit 20 is connected to a waveguide 90 via the first resonator 30. The second qubit 22 is connected to the waveguide 90 via the second resonator 32. In other words, the first qubit 20 and the second qubit 22 are connected in parallel to the waveguide 90 via the first resonator 30 and the second resonator 32, respectively. A coupling between the first qubit 20 and the first resonator 30 is variable. A coupling between the second qubit 22 and the second resonator 32 is variable. In this manner, in the first embodiment, by making a coupling between each qubit and a resonator variable, a relaxation rate of each qubit with respect to the waveguide 90 can be controlled. An interval D between the first resonator 30 and the second resonator 32 is (¼+n/2) times as long as a wavelength λ of microwave photons.

In other words, the interval D is represented as follows:

$$D = (1/4 + n/2) * \lambda \quad (1),$$

where n is an integer equal to or larger than 0 (the same applies to the following unless otherwise stated). A specific upper limit is not provided on the value of n. Nevertheless, the value of n is preferably as small as possible because the influence of delay is exerted if the value of n becomes too large. The direct coupling 40 is formed between the first resonator 30 and the second resonator 32.

The first qubit 20 and the second qubit 22 are superconducting qubits formed by superposition of a two-level system of a ground state |g> and an excited state |e>. Here, a state caused when the first qubit is in the excited state and the second qubit is in the ground state is denoted by |e,g>. In addition, a state caused when the first qubit is in the ground state and the second qubit is in the excited state is denoted by |g,e>. Furthermore, a state caused when both the first qubit and the second qubit are in the ground state is denoted by |g,g>, and a state caused when both the first qubit and the second qubit are in the excited state is denoted by |e,e>. A quantum entangled state is formed between the first qubit 20 and the second qubit 22.

The quantum entangled state |Ψ> is represented as follows:

$$|\Psi\rangle = (1/\sqrt{2}) \ (|e,g\rangle + \exp(i\varphi) \ |g,e\rangle) \ \ldots \ (2),$$ where $\varphi$ denotes a phase difference of the quantum entangled state between the first qubit 20 and the second qubit 22. The quantum entangled state is realized by combining the execution of a C-NOT gate (e.g., refer to Non Patent Literature 3) operation performed by emitting microwaves to the first qubit 20 and the second qubit 22 from an external microwave transmitter 80, for example, and the execution of a single qubit gate operation performed by emitting microwaves resonant with each qubit. Alternatively, the quantum entangled state can also be formed by causing energy exchange by bringing either one of the first qubit 20 and the second qubit 22 into the excited state, and resonating the both qubits. In addition, a phase difference of the quantum entangled state can be controlled by emitting nonresonant microwaves and modulating a resonant frequency of either one of the qubits, for example.

By the direct coupling 40 formed between the first resonator 30 and the second resonator 32, a coupling via the waveguide 90 between the first qubit 20 and the second qubit 22 can be cancelled out. Hereinafter, this point will be described.

Generally, if two qubits are connected in parallel to a waveguide, a coupling via the waveguide is generated between the both qubits. Especially in a case where the interval D between both qubits is $(1/4+n/2)*\lambda$ as in the present embodiment, at the coupling via the waveguide, energy exchange interaction between both qubits becomes dominant. By the energy exchange, the quantum entangled state between both qubits is destroyed. If the quantum entangled state is destroyed, the performance of a microwave photon control device declines. It is accordingly demanded to cancel out a coupling via a waveguide between both qubits.

In the present embodiment, the first qubit 20 and the second qubit 22 are connected in parallel to the waveguide 90 via the first resonator 30 and the second resonator 32, respectively. In this case, a coupling via the waveguide 90 between the first qubit 20 and the second qubit 22 becomes a coupling via the waveguide 90 between the first resonator 30 and the second resonator 32. If a relaxation rate of the first resonator 30 and the second resonator 32 with respect to the waveguide 90 is denoted by $\gamma$, a coupling J via the waveguide 90 between the first resonator 30 and the second resonator 32 can be represented as follows:

$$J = \gamma/2 \qquad (3).$$

Here, a relaxation rate of the first resonator 30 and the second resonator 32 with respect to the waveguide 90 can be made temporally constant. Accordingly, by forming the direct coupling 40 between the first resonator 30 and the second resonator 32 using a capacitive coupling, for example, and setting the direct coupling 40 as −J (i.e., a coupling having the same size as the coupling J via the waveguide 90 between the first resonator 30 and the second resonator 32, and having an opposite sign), the coupling J via the waveguide 90 between the first resonator 30 and the second resonator 32 can be cancelled out. At this time, it should be noted that the direct coupling 40 (−J) can also be made temporally constant because the relaxation rate $\gamma$ of the first resonator 30 and the second resonator 32 with respect to the waveguide 90 is temporally constant.

By the relaxation rate of the first qubit 20 and the second qubit 22 being controlled, the microwave photon control device 1 operates while switching between a first operation mode, a second operation mode, and a third operation mode. As an example of a control method of the relaxation rate of qubits, there is a method of controlling the strength of a coupling between a qubit and a resonator in accordance with the intensity of microwaves emitted from the external microwave transmitter 80, and controlling an effective relaxation rate of the qubit with respect to a waveguide via the resonator (e.g., refer to Non Patent Literature 1). Hereinafter, this point will be described.

Figure 3:
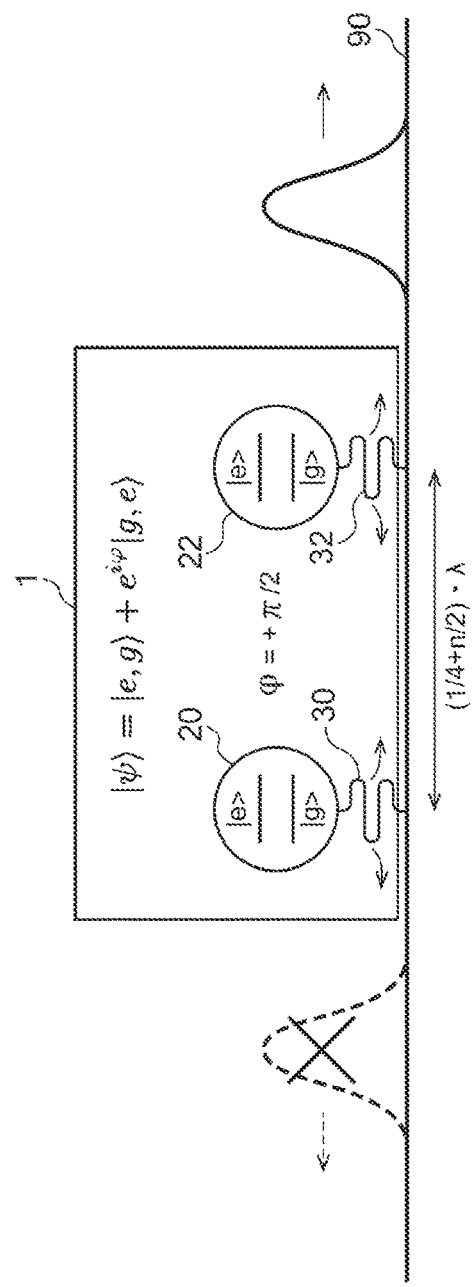
FIG. 3 is a schematic diagram illustrating an operation of the microwave photon control device in FIG. 2 in a first operation mode. A phase difference between a first qubit and a second qubit is $+\pi/2$.
Figure 4:
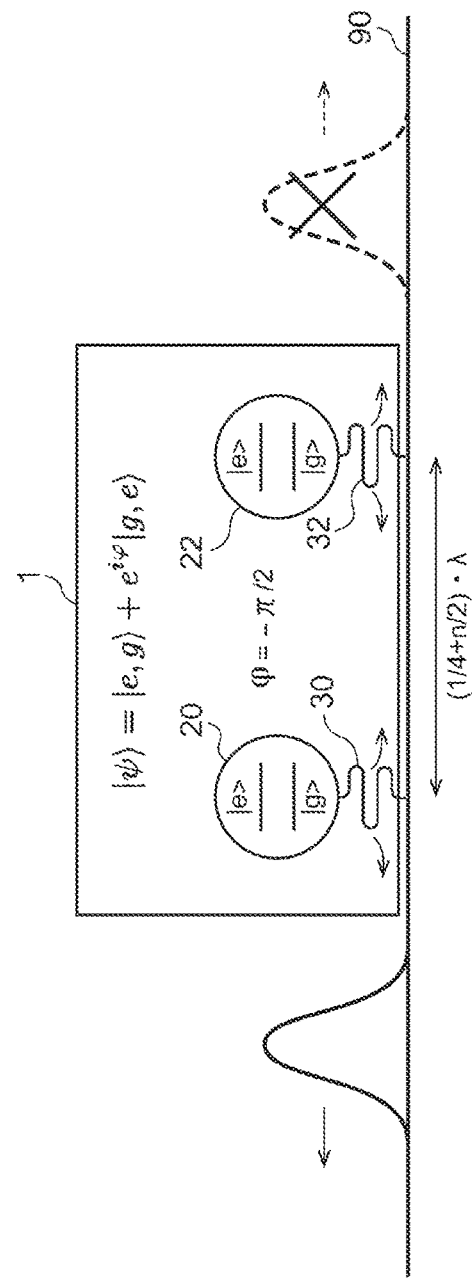
FIG. 4 is a schematic diagram illustrating an operation of the microwave photon control device in FIG. 2 in the first operation mode. A phase difference between the first qubit and the second qubit is $-\pi/2$.

FIGS. 3 and 4 each illustrate an operation of the microwave photon control device 1 in the first operation mode. In the first operation mode, the microwave photon control device 1 emits microwave photons in one direction of the waveguide 90.

FIG. 3 illustrates an operation of the microwave photon control device 1 that is performed when the phase difference $\varphi$ of the quantum entangled state between the first qubit 20 and the second qubit 22 is $+\pi/2$. By setting the phase difference $\varphi$ of the quantum entangled state to $+\pi/2$ or $-\pi/2$, photons can be emitted in opposite directions in accordance with the phase difference $\varphi$. In the example illustrated in FIG. 3, photons emitted from the microwave photon control device 1 propagate only rightward through the waveguide 90. In other words, photons emitted from the microwave photon control device 1 neither propagate leftward through the waveguide 90, nor be reabsorbed by the first qubit 20 and the second qubit 22.

FIG. 4 illustrates an operation of the microwave photon control device 1 that is performed when the phase difference $\varphi$ between the first qubit 20 and the second qubit 22 is $-\pi/2$. In the example illustrated in FIG. 4, photons emitted from the microwave photon control device 1 propagate only leftward through the waveguide 90 in contrast to FIG. 3. In other words, photons emitted from the microwave photon control device 1 neither propagate rightward through the waveguide 90, nor be reabsorbed by the first qubit 20 and the second qubit 22.

The microwave photon control device 1 emits microwave photons only in one direction of the waveguide 90 in the first operation mode because an interval between the first qubit 20 and the second qubit 22 is (¼+n/2) times as long as the wavelength of microwave photons. With this configuration, in the example illustrated in FIG. 3, among photons emitted from the first qubit 20 and the second qubit 22, photons propagating leftward through the waveguide 90 disappear due to interference. On the other hand, among photons emitted from the first qubit 20 and the second qubit 22, photons to be reabsorbed by the qubits (i.e., photons to be affected by energy exchange interaction between both qubits via the waveguide) disappear due to the direct coupling 40. In this manner, only photons propagating rightward through the waveguide 90 are fully emitted from the qubits to propagate.

Figure 5:
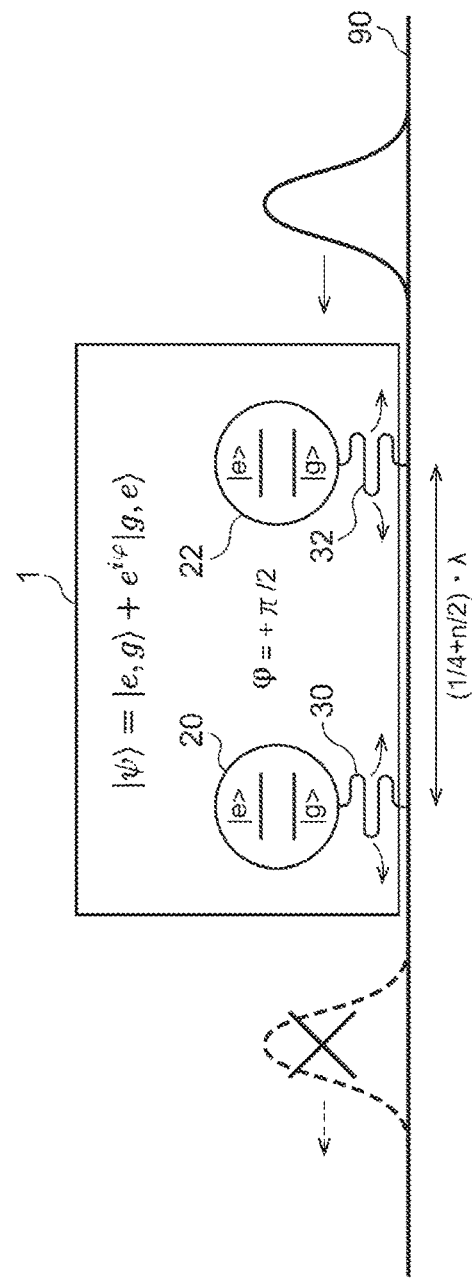
FIG. 5 is a schematic diagram illustrating an operation of the microwave photon control device in FIG. 2 in a second operation mode.
Figure 6:
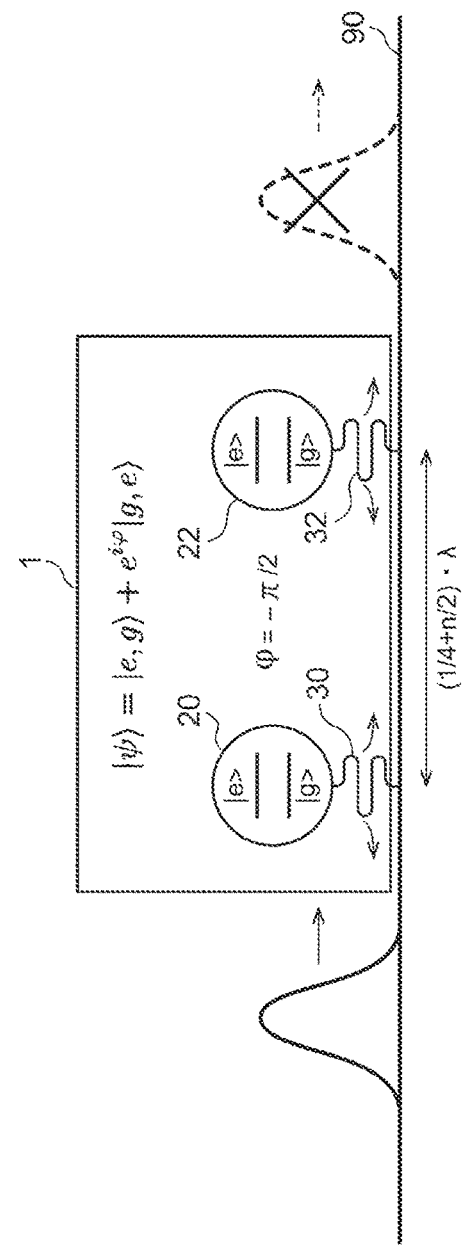
FIG. 6 is a schematic diagram illustrating an operation of the microwave photon control device in FIG. 2 in the second operation mode.

FIGS. 5 and 6 each illustrate an operation of the microwave photon control device 1 in the second operation mode. In the second operation mode, the microwave photon control device 1 absorbs microwave photons that have propagated from one direction of the waveguide 90. In the second operation mode, the state |g,g> caused when both the first qubit 20 and the second qubit 22 are in the ground state is prepared as an initial state. With this configuration, photons that have entered the microwave photon control device 1 are absorbed by qubits. The qubits consequently enter the excited state.

In the example illustrated in FIG. 5, the microwave photon control device 1 absorbs all the photons that have propagated leftward through the waveguide 90. In other words, photons that have entered the microwave photon control device 1 neither pass through the microwave photon control device 1 to propagate leftward through the waveguide 90, nor be reflected by the microwave photon control device 1 to propagate rightward through the waveguide 90. If photons are absorbed, the phase difference $\varphi$ of the quantum entangled state between the first qubit 20 and the second qubit 22 consequently becomes $+\pi/2$.

In the example illustrated in FIG. 6, the microwave photon control device 1 absorbs all the photons that have propagated rightward through the waveguide 90. In other words, photons that have entered the microwave photon control device 1 neither pass through the microwave photon control device 1 to propagate rightward through the waveguide 90, nor be reflected by the microwave photon control device 1 to propagate leftward through the waveguide 90. If photons are absorbed, the phase difference $\varphi$ of the quantum entangled state between the first qubit 20 and the second qubit 22 consequently becomes $-\pi/2$.

The microwave photon control device 1 absorbs all the photons that have propagated in one direction of the waveguide 90 in the second operation mode because an interval between the first qubit 20 and the second qubit 22 is (¼+n/2) times as long as the wavelength of microwave photons. With this configuration, along with the absorption of photons, photons emitted from the first qubit 20 and the second qubit 22 disappear due to interference, and photons that have propagated from the waveguide 90 in one direction are fully absorbed.

Figure 7:
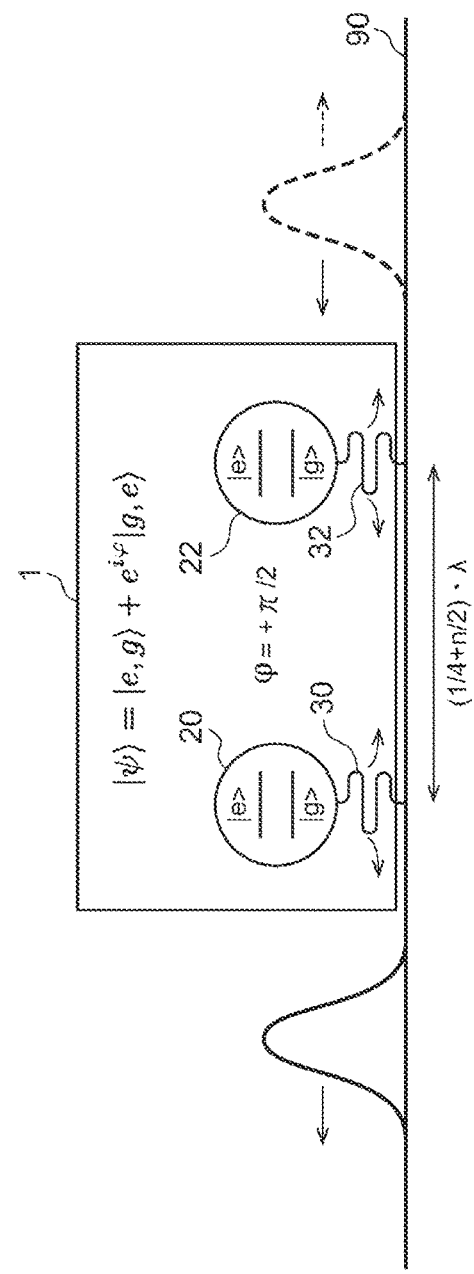
FIG. 7 is a schematic diagram illustrating an operation of the microwave photon control device in FIG. 2 in a third operation mode.
Figure 8:
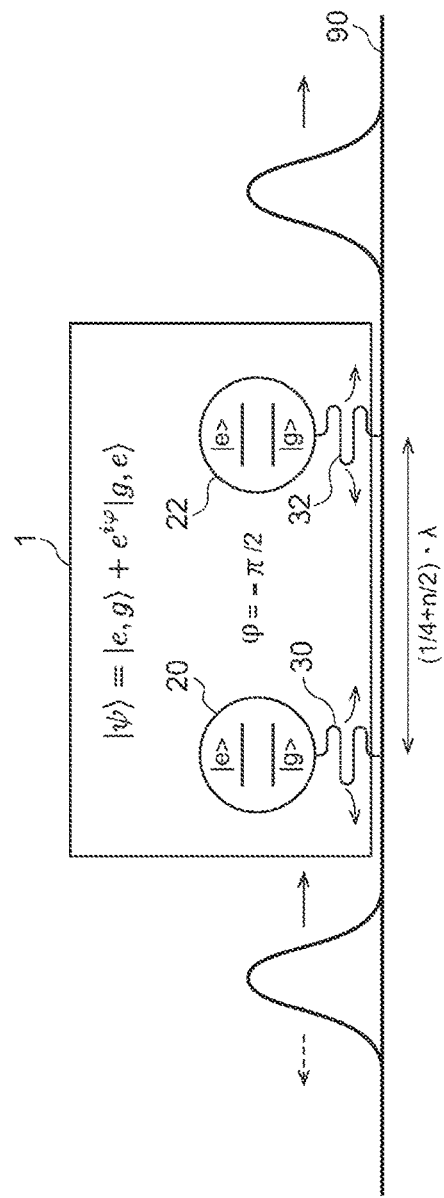
FIG. 8 is a schematic diagram illustrating an operation of the microwave photon control device in FIG. 2 in the third operation mode.

FIGS. 7 and 8 each illustrate an operation of the microwave photon control device 1 in the third operation mode. In the third operation mode, the microwave photon control device 1 lets through microwave photons that have propagated from one direction of the waveguide 90, to propagate. In the third operation mode, a coupling between the first qubit 20 and second resonator 30, and a coupling between the second qubit 22 and the second resonator 32 are both turned off as an initial state. With this configuration, photons fully pass through the microwave photon control device 1 to propagate without being reflected or absorbed by the microwave photon control device 1.

In the example illustrated in FIG. 7, the microwave photon control device 1 lets through all the photons that have propagated leftward through the waveguide 90. In other words, photons that have entered the microwave photon control device 1 neither be absorbed by the first qubit 20 and the second qubit 22, nor be reflected by the microwave photon control device 1 to propagate rightward through the waveguide 90.

In the example illustrated in FIG. 8, the microwave photon control device 1 lets through all the photons that have propagated rightward through the waveguide 90. In other words, photons that have entered the microwave photon control device 1 neither be absorbed by the first qubit 20 and the second qubit 22, nor be reflected by the microwave photon control device 1 to propagate leftward through the waveguide 90.

The microwave photon control device 1 lets through all the photons that have propagated in one direction through the waveguide 90, to propagate in the third operation mode because an interval between the first resonator 30 and the second resonator 32 is (¼+n/2) times as long as the wavelength of microwave photons. With this configuration, along with the propagation of photons, photons reflected by the first resonator 30 and the second resonator 32 disappear due to interference, and photons that have propagated from the waveguide 90 in one direction are fully passed through.

According to the present embodiment, the propagation direction of propagation microwave photons in a quantum network can be controlled without using a circulator. In particular, because the direct coupling 40 can be made temporally constant, the direct coupling 40 can be easily realized without requiring particular temporal control. Furthermore, because the microwave photon control device 1 can be used while switching between the first, second, and third operation modes, the microwave photon control device 1 is preferable as a router.

Second Embodiment

Figure 9:
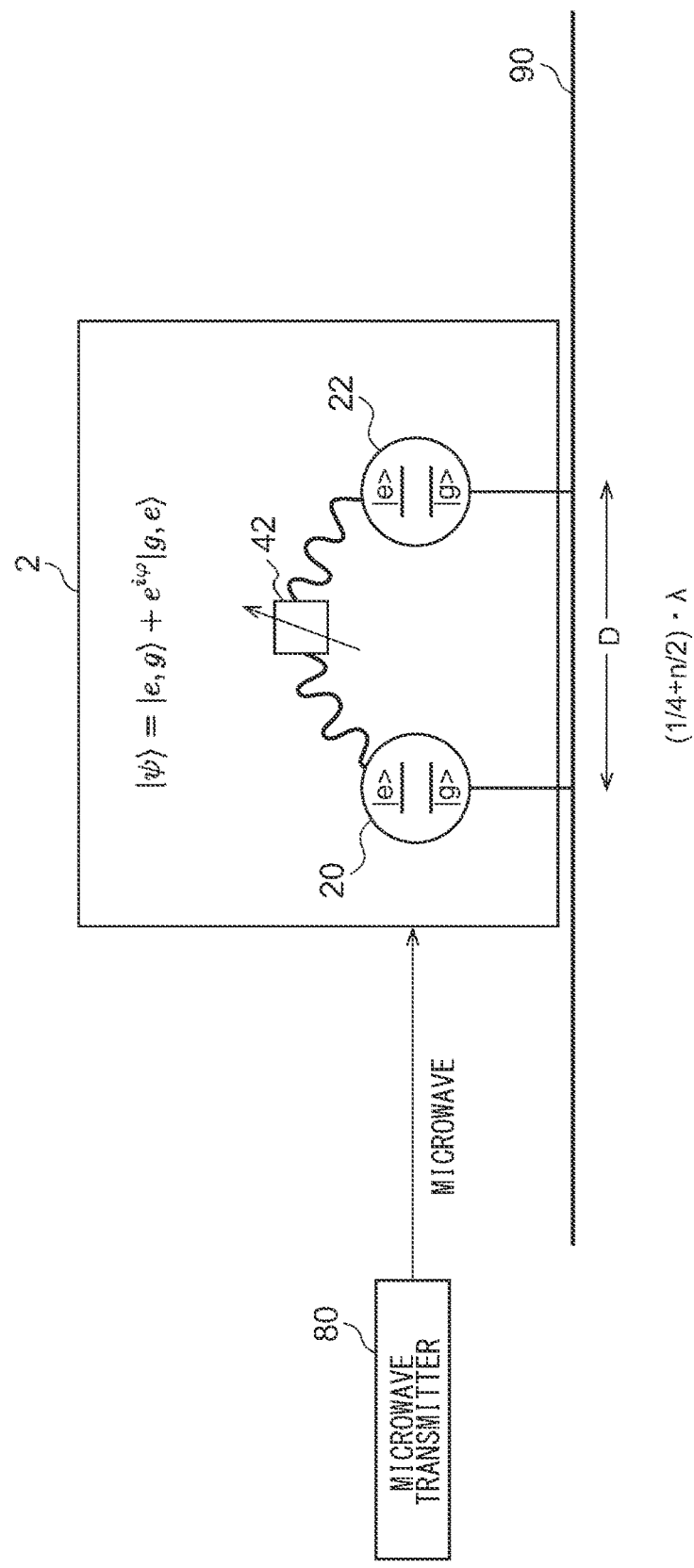
FIG. 9 is a schematic diagram of a microwave photon control device according to a second embodiment.

FIG. 9 schematically illustrates a microwave photon control device 2 according to the second embodiment. The microwave photon control device 2 includes a first qubit 20, a second qubit 22, and a direct coupling 42 between the first qubit 20 and the second qubit 22. The first qubit 20 and the second qubit 22 are directly connected in parallel to a waveguide 90. Similarly to the first embodiment, an interval D between the first qubit 20 and the second qubit 22 is (¼+n/2) times as long as a wavelength λ of microwave photons. As illustrated in the drawing, the direct coupling 42 is directly formed between the first qubit 20 and the second qubit 22. Other configurations and operations of the microwave photon control device 2 are similar to those of the microwave photon control device 1.

Unlike the microwave photon control device 1, in the microwave photon control device 2, the first qubit 20 and the second qubit 22 are directly connected to the waveguide 90 not via resonators. In this case, a relaxation rate γ of the first qubit 20 and the second qubit 22 with respect to the waveguide 90 temporally changes. In other words, the relaxation rate γ is represented as follows:

$$\gamma = \gamma(t) \qquad (4).$$

At this time, the control of the relaxation rate can be executed by using inductance modulation of SQUID (a superconducting quantum interference device), for example (e.g., refer to Non Patent Literature 4).

Also in the present embodiment, a coupling via the waveguide 90 is generated between the first qubit 20 and the second qubit 22. Because the interval D between the both qubits is (¼+n/2)*λ, at the coupling via the waveguide, energy exchange between both qubits becomes dominant, and the quantum entangled state between both qubits is thereby destroyed. It is therefore demanded to cancel out a coupling via a waveguide between both qubits.

Here, a coupling J via the waveguide 90 between the first qubit 20 and the second qubit 22 is temporally changing J(t), and can be represented as follows:

$$J(t) = \gamma(t)/2 \qquad (5).$$

In other words, by forming the direct coupling 42 between the first qubit 20 and the second qubit 22, and temporally changing the direct coupling 42 to become −J(t) (i.e., a coupling having the same size as the coupling J via the waveguide 90 between the first resonator 30 and the second resonator 32, and having an opposite sign), the coupling J via the waveguide 90 between the first qubit 20 and the second qubit 22 can be cancelled out.

As a method of temporally controlling a direct coupling, inductance modulation of the SQUID can be used (e.g., refer to Non Patent Literature 5). Alternatively, by providing a resonator for the direct coupling 42, and temporally changing the frequency of the resonator, the direct coupling 42 can also be temporally controlled. Furthermore, the direct coupling 42 may be formed using a capacitive coupling, and the direct coupling 42 may be directly temporally controlled.

According to the present embodiment, the propagation direction of propagation microwave photons in a quantum network can be controlled without using a circulator as well. As compared with the first embodiment, the number of components can be reduced because resonators are not required while it is necessary to temporally control the direct coupling 42.

The microwave photon control devices according to the first and second embodiments may further include a coupling controller and a quantum entangled state generator. The coupling controller controls a coupling between the first qubit and the waveguide, and a coupling between the second qubit 22 and the waveguide. The quantum entangled state generator generates a quantum entangled state between the first qubit and the second qubit. In this manner, by the microwave photon control device including the coupling controller and the quantum entangled state generator thereinside, a design freedom degree can be increased.

Third Embodiment

A microwave photon transmitter according to the third embodiment includes a first qubit and a second qubit that are connected in parallel to a waveguide through which microwave photons propagate, and a direct coupling between the first qubit and the second qubit. An interval between the first qubit and the second qubit is (¼+n/2) times as long as the wavelength of microwave photons. A quantum entangled state is formed between the first qubit and the second qubit. The above-described direct coupling cancels out a coupling via the waveguide between the first qubit and the second qubit, and by a relaxation rate of the first qubit and the second qubit, and the phase of the quantum entangled state being controlled, microwave photons are emitted in one direction of the waveguide. In other words, the present embodiment forms a microwave photon transmitter by extracting the first operation mode from the microwave photon control device of the second embodiment.

According to the present embodiment, a microwave photon transmitter that emits microwave photons only in one direction of a waveguide can be provided.

The microwave photon transmitter may further include a first resonator and a second resonator. At this time, the first qubit and the second qubit are connected to the waveguide via the first resonator and the second resonator, respectively. The direct coupling is formed between the first resonator and the second resonator. The direct coupling is temporally constant. The control of couplings between the first qubit and the second qubit, and the waveguide is control of a coupling between the first qubit and the first resonator, and a coupling between the second qubit and the second resonator.

Fourth Embodiment

A microwave photon receiver according to the fourth embodiment includes a first qubit and a second qubit that are connected in parallel to a waveguide through which microwave photons propagate, and a direct coupling between the first qubit and the second qubit. An interval between the first qubit and the second qubit is ($\frac{1}{4}$+n/2) times as long as the wavelength of microwave photons. A quantum entangled state is formed between the first qubit and the second qubit. The above-described direct coupling cancels out a coupling via the waveguide between the first qubit and the second qubit, and by a relaxation rate of the first qubit and the second qubit, and the phase of the quantum entangled state being controlled, microwave photons that have propagated from one direction of the waveguide are absorbed. In other words, the present embodiment forms a microwave photon receiver by extracting the second operation mode from the microwave photon control device of the second embodiment.

According to the present embodiment, a microwave photon receiver that absorbs all photons that have propagated in one direction through a waveguide can be provided.

The microwave photon receiver may further include a first resonator and a second resonator. At this time, the first qubit and the second qubit are connected to the waveguide via the first resonator and the second resonator, respectively. The direct coupling is formed between the first resonator and the second resonator. The direct coupling is temporally constant.

Fifth Embodiment

A microwave photon repeater according to the fifth embodiment includes a first qubit and a second qubit that are connected in parallel to a waveguide through which microwave photons propagate, and a direct coupling between the first qubit and the second qubit. An interval between the first qubit and the second qubit is ($\frac{1}{4}$+n/2) times as long as the wavelength of microwave photons. A quantum entangled state is formed between the first qubit and the second qubit. The above-described direct coupling cancels out a coupling via the waveguide between the first qubit and the second qubit, and by a relaxation rate of the first qubit and the second qubit, and the phase of the quantum entangled state being controlled, photons that have propagated in one direction through the waveguide are all passed through to propagate. In other words, the present embodiment forms a microwave photon repeater by extracting the third operation mode from the microwave photon control device of the second embodiment.

According to the present embodiment, photons that have propagated in one direction through the waveguide can be relayed without destroying the quantum entangled state of the photons.

The microwave photon repeater may further include a first resonator and a second resonator. At this time, the first qubit and the second qubit are connected to the waveguide via the first resonator and the second resonator, respectively. The direct coupling is formed between the first resonator and the second resonator. The direct coupling is temporally constant.

In the first embodiment, the control of a relaxation rate of the first qubit and the second qubit, and a phase of the quantum entangled state is performed using microwaves transmitted from the external microwave transmitter. In addition, in the second embodiment, the control of the relaxation rate is performed using inductance modulation of the SQUID. Nevertheless, the control is not limited to these types of control, and these types of control may be performed using any preferred method.

In the above-described embodiment, qubits are superconducting qubits. Nevertheless, qubits are not limited to these, and qubits may be any preferred qubits such as cooled ion qubits, for example.

In the above-described embodiment, the description has been given of an example of using a propagation single micro photon as a propagation microwave photon. Nevertheless, the propagation microwave photon is not limited to this, and the propagation microwave photon may be a superposition state of a vacuum state and a single microwave photon state, or a superposition state of a time multimode of a single microwave photon.

Figure 10:
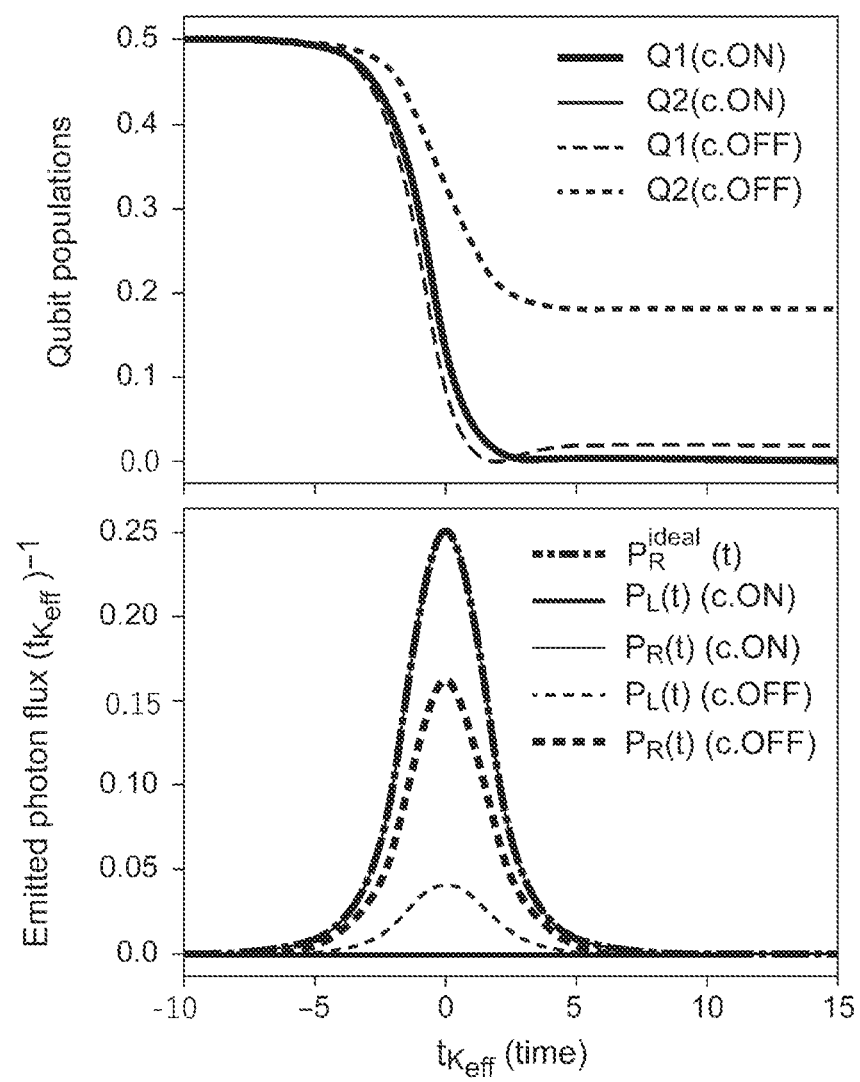
FIG. 10 illustrates a simulation result indicating a difference in photoemission that is attributed to the existence or non-existence of a direct coupling between resonators when the microwave photon control device in FIG. 2 operates in the first operation mode.

Next, a difference in photoemission between a case where a direct coupling exists between resonators, and a case where a direct coupling does not exist, in a case where a microwave photon control device operates in the first operation mode is checked by simulation. FIG. 10 illustrates a simulation result indicating a difference in photoemission that is attributed to the existence or non-existence of the direct coupling 40 between resonators when the microwave photon control device 1 in FIG. 2 operates in the first operation mode. At this time, the microwave photon control device 1 is adjusted in phase in such a manner as to emit photons rightward through the waveguide 90.

An upper part of FIG. 10 illustrates time changes of qubit populations of the first qubit 20 and the second qubit 22. A lower part of FIG. 10 illustrates time changes of fluxes of photons emitted from the first qubit 20 and the second qubit 22. In the upper part, the time change of the qubit 20 is indicated by Q1, and the time change of the qubit 22 is indicated by Q2. In addition, a time change caused in a case where the direct coupling 40 exists is indicated by a solid line, and a time change caused in a case where the direct coupling 40 does not exist is indicated by a dotted line. More specifically, in the upper part, Q1(c.ON) indicates the time change of the qubit 20 that is caused when the direct coupling 40 exists, Q2(c.ON) indicates the time change of the qubit 22 that is caused when the direct coupling 40 exists, Q1(c.OFF) indicates the time change of the qubit 20 that is caused when the direct coupling 40 does not exist, and Q2(c.OFF) indicates the time change of the qubit 22 that is caused when the direct coupling 40 does not exist. In the lower part, a subscript "L" denotes a photon emitted leftward, and a subscript "R" denotes a photon emitted rightward. More specifically, in the lower part, PRideal(t) denotes the time change of a flux emitted rightward under an ideal condition, PL(t) (c.ON) denotes the time change of a flux emitted leftward when the direct coupling 40 exists, PR(t) (c.ON) denotes the time change of a flux emitted rightward when the direct coupling 40 exists, PL(t) (c.OFF) denotes the time change of a flux emitted leftward when the direct coupling 40 does not exist, and PR(t) (c.OFF) denotes the time change of a flux emitted rightward when the direct coupling 40 does not exist. A flux emitted leftward under an ideal condition (flux corresponding to PLideal(t)) is at 0 over the entire time slot, which is not illustrated in the lower part.

As illustrated in the upper part, when the direct coupling 40 exists, populations of both the first qubit 20 and the second qubit 22 change to 0% after photoemission from 50% obtained before photoemission. In other words, it can be seen that, when the direct coupling 40 exists, photons are fully emitted rightward through the waveguide 90. In contrast to this, when the direct coupling 40 does not exist, even after photoemission, several percentages of photons remain in the first qubit 20, and about 20% photons remain in the second qubit 22. In other words, it can be seen that, when the direct coupling 40 does not exist, photons are not fully emitted rightward through the waveguide 90, and 20% or more photons are emitted leftward.

As illustrated in the lower part, the wave shape of the time change of a flux of a photon emitted from a qubit has skirts spreading forward and rearward from a peak corresponding to tkeff=0. Under the ideal condition, only fluxes PRideal(t) emitted rightward exist over the entire time slot (about tkeff=−10 to 10) in which photons are emitted. At this time, the maximum value of the PRideal(t) is PRideal(0)≈0.25. In contrast to this, a simulation result obtained when the direct coupling 40 exists almost completely matches the result obtained under the ideal condition, over the entire time slot (i.e., PR(t) (c.ON)≈PRideal(t), PL(t) (c.ON)≈0). From this, it can be seen that, in a case where the direct coupling 40 exists, such an ideal result that photons are emitted only in one direction (rightward) is obtained. In contrast to this, the wave shape of a simulation result obtained when the direct coupling 40 does not exist has skirts spreading forward and rearward from a peak corresponding to tkeff=0, for both of the flux PR(t) (c.OFF) (i.e., the flux of the photon emitted rightward) and the flux PL(t) (c.OFF) (i.e., the flux of the photon emitted leftward). At this time, the maximum values of the fluxes PR(t) (c.OFF) and PL(t) (c.OFF) are PR(0) (c.OFF)≈0.16 and PL(0) (c.OFF)≈0.04, respectively. In other words, at tkeff=0, almost 80% photons are emitted rightward and almost 20% photons are emitted leftward. From this, it can be seen that, in a case where the direct coupling 40 does not exist, about 20% photons are emitted in the opposite direction to the original direction.

From the above simulation result, it can be seen that, by the direct coupling 40 existing between the first resonator 30 and the second resonator 32, a coupling via the waveguide 90 is cancelled out, and photoemission in almost ideal one direction is realized.

Sixth Embodiment

Figure 11:
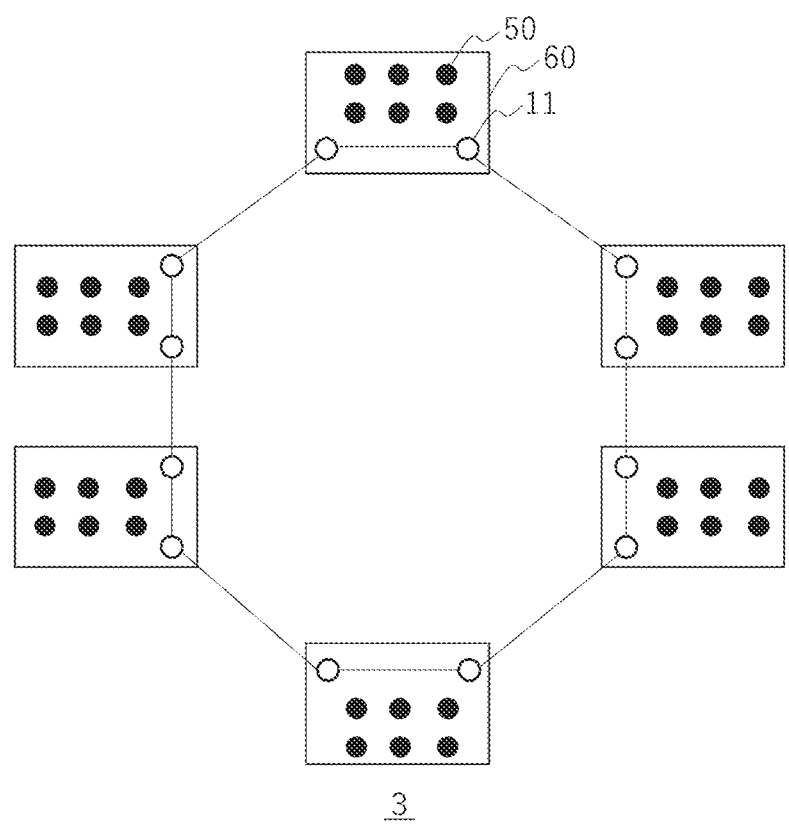
FIG. 11 is a schematic diagram of a quantum computer according to a sixth embodiment.

FIG. 11 schematically illustrates a quantum computer 3 according to the sixth embodiment. The quantum computer 3 includes a plurality of microwave photon control devices 11 described above that are arranged at ends of a quantum circuit module 60 on which a plurality of superconducting qubits 50 are implemented, and transmit and receive quantum states between the quantum circuit modules 60.

The writing of the quantum state into superconducting qubits and readout of the quantum state from superconducting qubits are performed by emitting microwaves to superconducting qubits. Thus, about two to four cables are required for each qubit. Furthermore, because the quantum computer 3 is operated under extremely-low temperature, a circuit on which superconducting qubits are implemented needs to be stored into a freezing machine. Accordingly, it is physically difficult to implement a large number of qubits onto one substrate. In other words, it is not easy to realize a large-scale quantum computer using one substrate. In view of this, it is considered to realize a quantum computer using a network formed by dividing superconducting qubits required for realizing a quantum computer, for each module of about several tens of bits, forming quantum circuit modules including substrates on which the superconducting qubits are implemented, and then connecting these quantum circuit modules in a quantum manner. At this time, if a circulator or the like is used for quantum connection between quantum circuit modules, the problem of upsizing of the device arises. In view of the foregoing, in the present embodiment, quantum circuit modules are connected in a quantum manner by implementing a plurality of microwave control devices (pairs of superconducting qubits) described above, at the ends of quantum circuit modules. With this configuration, it becomes possible to easily transmit a quantum state generated in a quantum circuit module, to another quantum circuit module as a microwave photon, and receive a quantum state in turn. In this manner, according to the present embodiment, a quantum computer can be effectively formed.

The present invention has been described above based on the embodiments. These embodiments are examples, and the one skilled in the art understands that various modifications can be made on combinations of constituent elements and processing processes of these, and such modifications are included in the scope of the present invention.

INDUSTRIAL APPLICABILITY

The present invention can be used in a microwave photon control device, a microwave photon transmitter, a microwave photon receiver, and a microwave photon repeater.

REFERENCE SIGNS LIST

1 microwave photon control device, 2 microwave photon control device, 3 quantum computer, 11 microwave photon control device, 20 first qubit, 22 second qubit, 30 first resonator, 32 second resonator, 40 direct coupling, 50 superconducting qubit, 60 quantum circuit module, 80 microwave transmitter, 90 waveguide

The invention claimed is:

1. A microwave photon control device comprising:
   a first qubit and a second qubit that are connected in parallel to a waveguide through which microwave photons propagate, and a direct coupling between the first qubit and the second qubit,
   wherein an interval between the first qubit and the second qubit is ¼+n/2 times as long as a wavelength of microwave photons where n is an integer equal to or larger than 0,
   wherein a quantum entangled state is formed between the first qubit and the second qubit,
   wherein the direct coupling cancels out a coupling via the waveguide between the first qubit and the second qubit, and wherein, by a phase of the quantum entangled state between the first qubit and the second qubit, and/or couplings between the first qubit and the second qubit, and the waveguide being controlled, the microwave photon control device operates while switching between a first operation mode for emitting microwave photons in one direction of the waveguide, a second operation mode for absorbing microwave photons that have propagated from one direction of the waveguide, and a third operation mode for letting through microwave photons that have propagated from one direction of the waveguide, to propagate.

2. The microwave photon control device according to claim 1, further comprising:

a first resonator and a second resonator, wherein the first qubit and the second qubit are connected to the waveguide via the first resonator and the second resonator, respectively, wherein the direct coupling is formed between the first resonator and the second resonator, wherein the direct coupling is temporally constant, and wherein control of couplings between the first qubit and the second qubit, and the waveguide is control of a coupling between the first qubit and the first resonator, and a coupling between the second qubit and the second resonator.

3. The microwave photon control device according to claim 1, further comprising:

a coupling controller and a quantum entangled state generator, wherein the coupling controller controls a coupling between the first qubit and the waveguide, and a coupling between the second qubit and the waveguide, and wherein the quantum entangled state generator generates a quantum entangled state between the first qubit and the second qubit.

4. The microwave photon control device according to claim 1, wherein control of a relaxation rate of the first qubit and the second qubit, and a phase of the quantum entangled state is performed using received microwaves.

5. The microwave photon control device according to claim 1, wherein the first qubit and the second qubit are superconducting qubits.

6. A quantum computer comprising:

a plurality of microwave photon control devices according to claim 1 that are arranged at ends of a quantum circuit module on which a plurality of superconducting qubits is implemented, wherein the microwave photon control devices transmit and receive quantum states between the quantum circuit modules.

7. A microwave photon transmitter comprising:

a first qubit and a second qubit that are connected in parallel to a waveguide through which microwave photons propagate, and a direct coupling between the first qubit and the second qubit, wherein an interval between the first qubit and the second qubit is $1/4+n/2$ times as long as a wavelength of microwave photons where n is an integer equal to or larger than 0, wherein a quantum entangled state is formed between the first qubit and the second qubit, wherein the direct coupling cancels out a coupling via the waveguide between the first qubit and the second qubit, and wherein, by a phase of the quantum entangled state between the first qubit and the second qubit, and/or couplings between the first qubit and the second qubit, and the waveguide being controlled, the microwave photon transmitter emits microwave photons in one direction of the waveguide.

8. The microwave photon transmitter according to claim 7, further comprising:

a first resonator and a second resonator, wherein the first qubit and the second qubit are connected to the waveguide via the first resonator and the second resonator, respectively, wherein the direct coupling is formed between the first resonator and the second resonator, wherein the direct coupling is temporally constant, and wherein control of couplings between the first qubit and the second qubit, and the waveguide is control of a coupling between the first qubit and the first resonator, and a coupling between the second qubit and the second resonator.

9. A microwave photon receiver comprising:

a first qubit and a second qubit that are connected in parallel to a waveguide through which microwave photons propagate, and a direct coupling between the first qubit and the second qubit, wherein an interval between the first qubit and the second qubit is $1/4+n/2$ times as long as a wavelength of microwave photons (where n is an integer equal to or larger than 0, wherein the direct coupling cancels out a coupling via the waveguide between the first qubit and the second qubit, and wherein, by bringing both the first qubit and the second qubit into a ground state as an initial state, the microwave photon receiver absorbs microwave photons that have propagated from one direction of the waveguide.

10. The microwave photon receiver according to claim 9, further comprising:

a first resonator and a second resonator, wherein the first qubit and the second qubit are connected to the waveguide via the first resonator and the second resonator, respectively, wherein the direct coupling is formed between the first resonator and the second resonator, and wherein the direct coupling is temporally constant.

11. A microwave photon repeater comprising:

a first qubit and a second qubit that are connected in parallel to a waveguide through which microwave photons propagate, and a direct coupling between the first qubit and the second qubit, wherein an interval between the first qubit and the second qubit is $1/4+n/2$ times as long as a wavelength of microwave photons (where n is an integer equal to or larger than 0, wherein the direct coupling cancels out a coupling via the waveguide between the first qubit and the second qubit, and wherein, by turning off relaxation from the first qubit and the second qubit to the waveguide, the microwave photon repeater lets through microwave photons that have propagated from one direction of the waveguide, to propagate.

12. The microwave photon repeater according to claim 11, further comprising:

a first resonator and a second resonator,
wherein the first qubit and the second qubit are connected to the waveguide via the first resonator and the second resonator, respectively,
wherein the direct coupling is formed between the first resonator and the second resonator, and
wherein the direct coupling is temporally constant.

* * * * *